US010232667B2

United States Patent
Saito et al.

(10) Patent No.: US 10,232,667 B2
(45) Date of Patent: Mar. 19, 2019

(54) MOUNTING STRUCTURE FOR CASTER

(71) Applicant: NANSIN CO., LTD., Tokyo (JP)

(72) Inventors: Akinori Saito, Tokyo (JP); Minoru Onagi, Inzai (JP); Hayato Suzuki, Inzai (JP)

(73) Assignee: NANSIN CO., LTD., Tokyo (JP)

( * ) Notice: Subject to any disclaimer, the term of this patent is extended or adjusted under 35 U.S.C. 154(b) by 0 days.

(21) Appl. No.: 15/550,603

(22) PCT Filed: Feb. 12, 2015

(86) PCT No.: PCT/JP2015/053883
§ 371 (c)(1),
(2) Date: Oct. 3, 2017

(87) PCT Pub. No.: WO2016/129090
PCT Pub. Date: Aug. 18, 2016

(65) Prior Publication Data
US 2018/0037058 A1    Feb. 8, 2018

(51) Int. Cl.
*B60B 33/00* (2006.01)
*B62B 5/00* (2006.01)
(Continued)

(52) U.S. Cl.
CPC ........ *B60B 33/0026* (2013.01); *B60B 33/001* (2013.01); *B60B 33/0007* (2013.01);
(Continued)

(58) Field of Classification Search
CPC ........ B62B 3/02; B62B 5/0093; B65D 19/42; B60B 33/0026; B60B 33/0042;
(Continued)

(56) References Cited

U.S. PATENT DOCUMENTS 5,232,071 A * 8/1993 Kawanabe .......... B60B 33/0039
16/35 R
5,276,942 A * 1/1994 Estkowski ........... A47B 91/002
16/18 A
(Continued)

FOREIGN PATENT DOCUMENTS

GB         2417417 A  *  3/2006
JP     2001277806 A  * 10/2001
(Continued)

OTHER PUBLICATIONS

International Search Report dated Mar. 10, 2015, issued in counterpart International Application No. PCT/JP2015/053883 (1 page).

*Primary Examiner* — Jacob B Meyer
(74) *Attorney, Agent, or Firm* — Westerman, Hattori, Daniels & Adrian, LLP

(57) ABSTRACT

A caster mounting portion has a mounting member housing portion which houses the mounting member, the mounting member has a rotary shaft portion which is pivotally supported in a bearing recessed portion in the mounting member housing portion, an abutment body in which the rotary shaft portion is provided at an eccentric position and which is displaced by rotation to be widened to close the inside of the mounting member housing portion, an upper locking piece which engages with a locking receiving portion of an opposed wall, a lower locking piece which abuts against the bottom face of a latching portion, and a locking stepped portion which is urged by a leading end of an elastic arm, climbing over the aforementioned latching portion, and engages with the latching portion.

8 Claims, 6 Drawing Sheets

(51) Int. Cl.
  *B62B 3/02* (2006.01)
  *B65D 19/42* (2006.01)
(52) U.S. Cl.
  CPC ...... B60B 33/0028 (2013.01); B60B 33/0042 (2013.01); B60B 33/0068 (2013.01); B62B 5/00 (2013.01); *B60B 2310/306* (2013.01); *B60B 2900/113* (2013.01); *B60B 2900/541* (2013.01); *B62B 3/02* (2013.01); *B62B 5/0093* (2013.01); *B65D 19/42* (2013.01)
(58) Field of Classification Search
  CPC ............ B60B 33/0068; B60B 33/0028; B60B 33/0007; B60B 33/0005; B60B 33/001; B60B 33/0015; B60B 33/0018; B60B 33/0021; B60B 33/0023
  See application file for complete search history.

(56) References Cited

U.S. PATENT DOCUMENTS

| | | | | |
|---|---|---|---|---|
| 6,792,630 B1* | 9/2004 | Palmatier | ............. | A61G 7/012 280/43.17 |
| 6,854,159 B2* | 2/2005 | Ruitenbeek | ......... | B60B 33/0002 16/18 CG |
| 6,899,345 B1* | 5/2005 | Bearden | ............. | A01D 34/74 16/19 |
| 7,377,526 B2* | 5/2008 | Lan | ............. | B60B 33/001 16/18 R |
| 7,784,151 B2* | 8/2010 | Chen | ............. | B60B 1/006 16/35 R |
| 7,987,553 B2* | 8/2011 | Lin | ............. | B60B 33/0042 16/35 R |
| 9,090,125 B2* | 7/2015 | Block | ............. | B60B 33/0039 |
| 9,168,785 B2* | 10/2015 | Spektor | ............. | B60B 33/0076 |
| 9,527,347 B2* | 12/2016 | Spektor | ............. | B60B 33/0076 |
| 2002/0033307 A1* | 3/2002 | Mobley | ............. | A61G 7/00 188/1.12 |
| 2003/0094554 A1* | 5/2003 | Bushey | ............. | B60B 33/0002 248/223.41 |
| 2007/0215414 A1* | 9/2007 | Chiang | ............. | B60B 33/0021 188/1.12 |
| 2008/0229545 A1* | 9/2008 | Duvert | ............. | A47D 7/00 16/35 R |
| 2009/0276977 A1* | 11/2009 | Liao | ............. | B60B 33/0018 16/35 R |
| 2013/0212834 A1* | 8/2013 | Chen | ............. | B60B 33/0018 16/45 |
| 2015/0033500 A1* | 2/2015 | Block | ............. | B60B 33/0039 16/45 |
| 2016/0009132 A1* | 1/2016 | Spektor | ............. | B60B 33/0076 280/79.11 |
| 2017/0173998 A1* | 6/2017 | Yamamoto | ............. | B60B 33/021 |

FOREIGN PATENT DOCUMENTS

| | | | |
|---|---|---|---|
| JP | 2006-62429 A | | 3/2006 |
| JP | 2007331554 A | * | 12/2007 |
| JP | 2010-264851 A | | 11/2010 |
| JP | 2013193574 A | * | 9/2013 |
| JP | 2014-227083 A | | 12/2014 |
| JP | 5707005 B1 | * | 4/2015 |

* cited by examiner

Fig. 10(a)
Fig. 10(b)
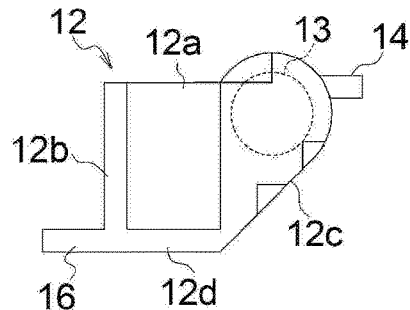
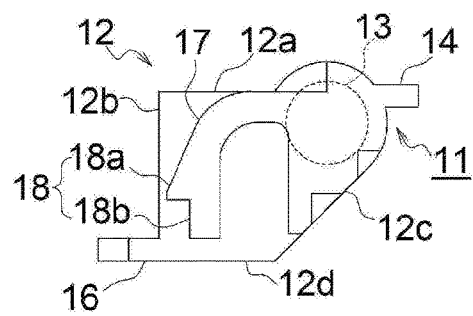
Fig. 11(a)
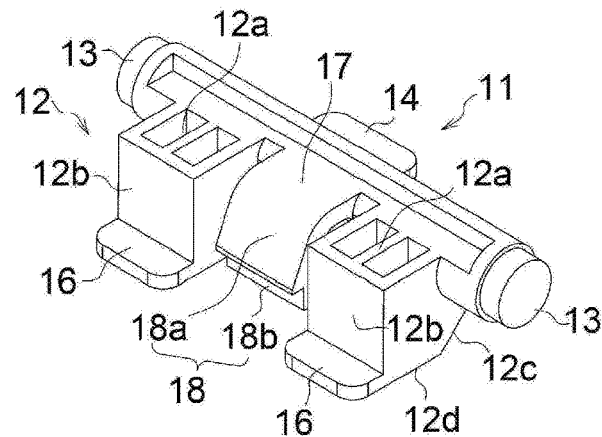
Fig. 11(b)
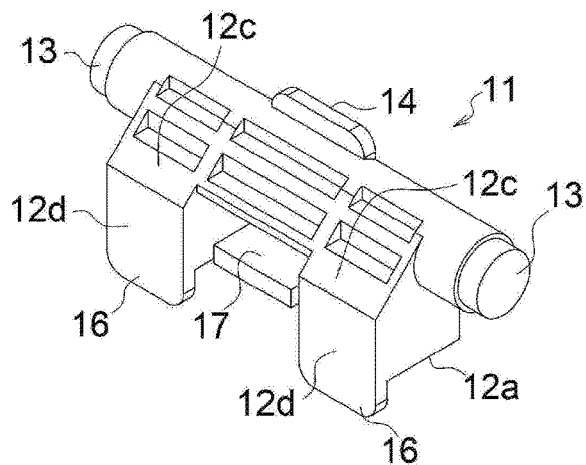

MOUNTING STRUCTURE FOR CASTER

TECHNICAL FIELD

The present invention relates to a mounting structure for caster configured such that when a caster is detachably fixed to a caster mounting portion provided on a bottom face of a weighing table of a carrier such as a carriage and so forth, the caster can be easily and surely mounted by using only one mounting member without using fixing brackets such as screws, bolts and so forth.

BACKGROUND ART

As a mounting structure for caster of this kind, for example, in a carriage in Japanese Unexamined Patent Application Publication 2006-62429, a configuration in which in the carriage configured by mounting a plurality of casters to a synthetic resin weighing table, a slide receiving portion into which a seat plate of the aforementioned caster is inserted from a horizontal direction is provided in the aforementioned weighing table, a lock arm which elastically deforms upward in sliding contact with the aforementioned inserted seat plate, is restored to its original form when the aforementioned seat plate has reached the inner part of the aforementioned slide receiving portion and is locked to an edge of the aforementioned seat plate so as to retain the aforementioned seat plate is formed in the slid receiving portion, and a retainer which is inserted into a space above the aforementioned the lock arm to regulate upward elastic deformation of the aforementioned lock arm and a retainer locking portion adapted to lock the aforementioned retainer to the aforementioned weighing table are provided is disclosed.

However, although in the above-described configuration, elastic deformation of the lock arm can be regulated by insertion of the retainer, there was such a problem that it is necessary to provide one pair of left and right retainer locking pieces having engagement projections on leading ends and to pierce retainer locking holes into which the above-described engagement projections are latched in places which correspond to the engagement projections of the aforementioned retainer locking pieces on the weighing table side and thereby the structure is complicated and accurate positioning of the engagement holes and the engagement projections becomes necessary.

Accordingly, the applicant of the present application achieves appropriate effects by proposing a structure that, in a mounting structure for caster which has a support wall portion which supports an upper surface of a caster mounting bed plate to a caster mounting portion provided on a weighing table of a mounted body in a predetermined posture, a first weighing table side latching portion which latches the one-end side of the aforementioned mounting bed plate from below and is fixed to the weighing table and a second weighing table side latching portion which faces the first weighing table side latching portion and latches the other side of the aforementioned mounting bed plate from below and the base end of which is mounted to the weighing tale to be tiltable in a direction separating from the aforementioned mounting bed plate, and a storage chamber which stores a mounting member for restraining the aforementioned second weighing table side latching portion is provided at the rear of the second weighing table side latching portion, the storage chamber is formed with an opposed wall potion which is fixed to the weighing table, facing the second weighing table side latching portion back and forth leaving a predetermined space, one pair of left and right sidewall portions which extend in parallel between and along the second weighing table side latching portion and the opposed wall portion, and one pair of slot portions which are formed in the sidewall portions, open on the second weighing table side latching portion side and obliquely incline toward the opposed wall portion, and the mounting member is configured by a mounting portion body configured by an almost rolled shape, a spindle portion which projects outward from sidewall faces on both of the left and right sides and is slidably inserted into the aforementioned slot portions, a cam face portion which is provided on an outer peripheral wall face of the mounting portion body and abuts against an inner surface of the aforementioned opposed wall portion to regulate rotation of the mounting member, and a restraining piece portion which maintains the aforementioned second weighing table side latching portion in a vertical posture at a position where the cam face portion abuts against the opposed wall portion and covers a latching portion of the second weighing table side latching portion from the outside to restrain it.

PRIOR ART LITERATURE

Patent Literature

Patent Literature 1: Japanese Unexamined Patent Application Publication No. 2006-62429

SUMMARY OF THE INVENTION

Problems to Be Solved by the Invention

The problem that the present invention intends to solve is to provide a mounting structure for caster that a single mounting member is used as a retainer which fixes a mounting bed plate of the caster and hereby the aforementioned mounting bed plate whose both ends are latched onto a first support wall portion and a second support wall portion which faces this can be detachably fixed to a caster mounting portion by using the mounting member.

Means for Solving the Problem

In order to solve the above-mentioned problem, in this invention is, it is characterized in that in a mounting structure for caster that a mounting bed plate of the caster is inserted into a caster mounting portion which is provided on a bottom face of a weighing table of a carrier from below and the aforementioned mounting bed plate is detachably fixed to a caster mounting portion which regulates movement in an upward direction and a left-right or front-back direction at a predetermined position by using one mounting member, the caster mounting portion has a first support wall portion with a stepped portion against which one end of the mounting bed plate abuts and which supports the bottom face on the one-end side, a second support wall portion which supports the bottom face on the other-end side of the aforementioned mounting bed plate, a mounting member housing portion which houses the mounting member adjacently to the second support wall portion, and a latching portion which is formed on the second support wall portion and projects into the mounting member housing portion, the aforementioned mounting member housing portion is provided with a locking receiving portion on an opposed wall portion which faces the second support wall portion separately from each other and has bearing recessed portions in one pair of left and right sidewalls, and the mounting member is configured by a rotary shaft portion which is rotatable by being pivotally supported in the aforementioned one pair of bearing recessed portions, an abutment body in which the rotary shaft portion is provided at an eccentric position and which is restrained in the mounting member housing portion by rotation of the rotary shaft portion, an upper locking piece which projects to one side from the rotary shaft portion side and can be latched onto the aforementioned locking receiving portion by rotation of the rotary shaft portion, a lower locking piece which projects in a direction facing the upper locking piece in the aforementioned abutment body and displaces to a position where it abuts against the bottom face of the aforementioned second support wall portion when the aforementioned upper locking piece displaces to a position where it engages with an engagement receiving portion by rotation of the rotary shaft portion, and a locking stepped portion which is formed on a leading end of an elastic arm which extends from the aforementioned rotary shaft portion to the lower locking piece side and is locked to a latching portion of the second support wall portion when the aforementioned lower locking piece abuts against the second support wall portion.

Effect of the Invention

In this invention, the mounting bed plate of the caster is fitted on the caster mounting portion, the mounting member is inserted into the mounting member housing portion, the rotary shaft portion of the mounting member is bore in the bearing recessed portion and then the mounting member is rotated, and thereby the other end of the mounting bed plate and the abutment body of the mounting member abut against each other with one end of the mounting bed plate being restrained by the first support wall portion and movement of the aforementioned other end is restrained, and simultaneously therewith, the upper locking piece of the mounting member is latched onto the locking receiving portions on the opposed wall portion of the mounting member housing portion, the lower locking portion is latched onto the bottom face of the second support wall portion and a locking claw portion is locked to the latching portion and thereby the mounting bed plate of the caster is rotated by using one mounting member thereby to make it possible to detachably fix the caster to the caster mounting portion.

BRIEF DESCRIPTION OF DRAWINGS

FIG. 10($a$) is a sectional diagram along the a-a line in FIG. 9 and FIG. 10($b$) is a sectional diagram along the b-b line in the same.

FIG. 11($a$) is a perspective view that the mounting member is viewed from the rear-face side and FIG. 11($b$) is a perspective view that it is viewed from the front-face side.

MODE FOR CARRYING-OUT THE INVENTION

A mounting base plate of a caster is inserted into a caster mounting potion which is provided on a bottom face of a carrier such as a carriage and so forth from below, one mounting member is inserted into the caster mounting portion which regulates movement in an upward direction and a left-right or front-back direction at a predetermined portion and the mounting member is rotated through a predetermined angle and thereby detachable and easy fixing of the mounting bed plate to the caster mounting portion is realized.

Embodiment 1

In the following, a preferred embodiment of a case where a mounting structure for caster of the present invention is applied to a weighing table (a loading platform) 1 of a carriage 10 will be described with reference to the drawings.

Figure 14:
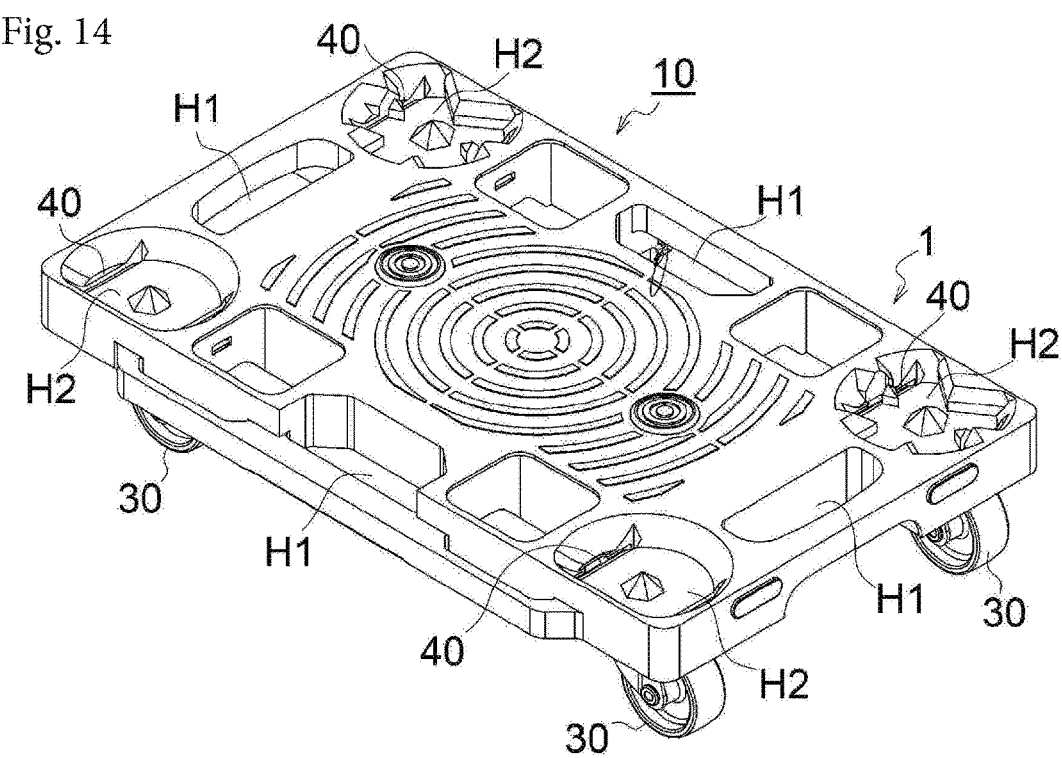
FIG. 14 is a perspective view of a carriage.

In a case of the present embodiment, as illustrated in FIG. 14, the weighing table 1 is rectangular and is made of synthetic resin and through-holes for gripping H1, recessed portions H2 which are provided in upper surface four corners and into which wheels of a caster 30 of the weighing table 1 to be piled up on an upper stage when stacking fit and so forth are appropriately formed in an upper surface thereof.

Figure 1:
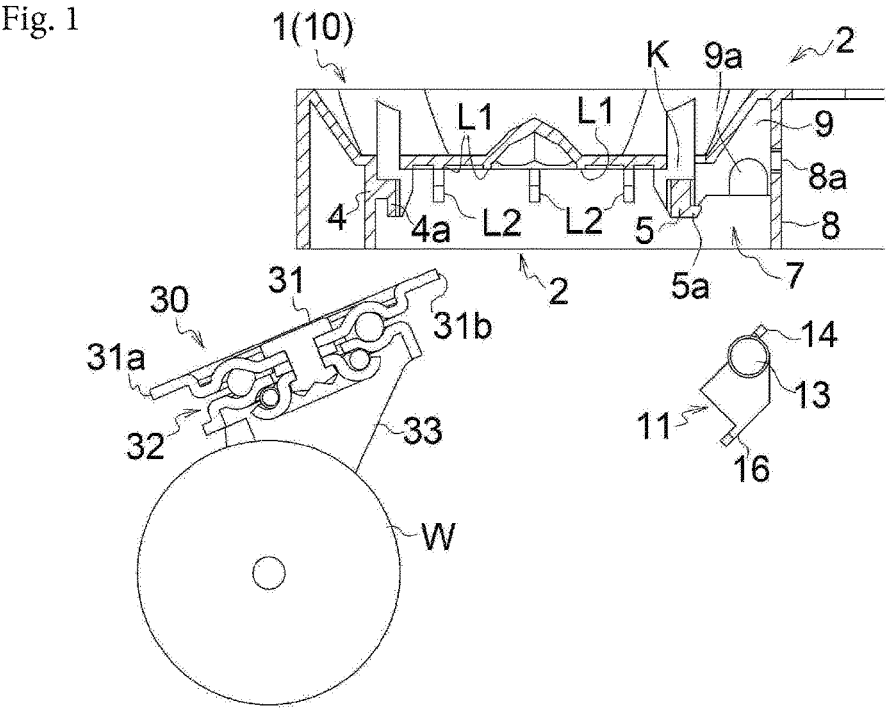
FIG. 1 is a pre-mounted side view illustrating essential parts of a mounting structure for caster.
Figure 2:
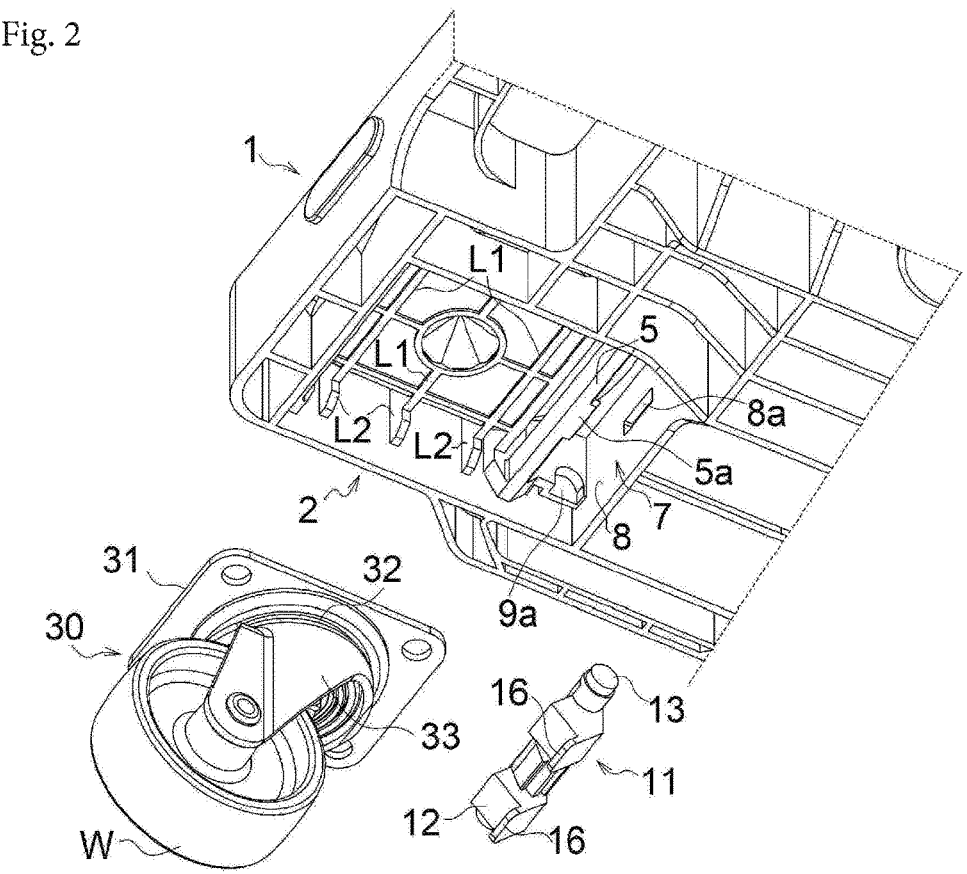
FIG. 2 is a perspective view viewed from the bottom face side thereof.

As illustrated in FIG. 1 and FIG. 2, a reinforcement rib which suspends from the upper surface of the weighing table 1 is installed in a protruded state on a back surface of the above-mentioned weighing table 1 in an appropriate shape such as a latticed shape and so forth and caster mounting portions 2 adapted to fix mounting bed plates 31 of the casters 30 are formed on four corners thereof.

Although in the present embodiment, bottom faces of the aforementioned recessed portions H2 are formed on the caster mounting portions 2, there is no particular limit on the configuration of the upper surface of the weighing table 1 which corresponds to each caster mounting portion 2 in the present invention.

Although, here, as the caster 30, a swivel caster which has the plate-shaped mounting bed plate 31 thereon and that a support yoke 33 which pivotally supports a wheel W is mounted to the mounting bed plate 31 via a bearing portion 32 so as to freely swivel is used, a straight-travel caster that the aforementioned support yoke 33 is fixed to the mounting bed plate 31 may be used.

In addition, the caster 30 may be the single-wheel one or the double-wheel one and may be the one that a plurality of casters are attached to one mounting bed plate 31.

As described before, the caster mounting portion 2 is installed under the bottom face of the recessed portion H2.

The caster mounting portion 2 has a plurality of ribs L1 which regulate upward movement of the mounting bed plate 31 of the caster 30 at a predetermined position which is designated in advance to restrain it in a horizontal posture and a plurality of pairs of left and right ribs L2 which regulate movement in the left-right or front-back direction (in the present embodiment, the left-right direction) of the mounting bed plate 31.

In addition, a first support wall portion 4 which closes the front and has a hook-shaped stepped portion 4a against which one end 31a of the mounting bed plate 31 abuts and which supports the bottom face on the first-end 31a side when the mounting bed plate 31 moves horizontally is formed in a direction (in the present embodiment, the front-back direction) that the mounting bed plate 31 is made movable by the caster mounting portion 2.

On the other hand, a second support wall portion 5 whose upper part is opened (K) so as to support the bottom face on the other end 31b side such that the other end 31b does not abut against it when the other end 31b of the aforementioned mounting bed plate 31 horizontally moves backward is fixedly attached to the caster mounting portion 2 on a place where it faces the first support wall portion 4 at the rear separately therefrom.

A mounting member housing portion 7 whose lower face is opened in order to house a later described mounting member 11 is disposed in the caster mounting portion 2 adjacently to the second support wall portion 5.

In addition, the aforementioned second support wall portion 5 has a latching potion 5a which projects into the mounting member housing portion 7 at its lower end.

In the present embodiment, the latching portion 5a is installed at the center of the bottom face of the second support wall portion 5 in order to make it engage with a later described locking claw portion 18 (see FIG. 2).

The aforementioned mounting member housing portion 7 is provided with a locking receiving portion 8a which is configured by a window hole in an opposed wall 8 which faces the second support wall portion 5 separately therefrom.

In addition, one pair of left and right sidewalls 9 of the mounting member housing portion 7 have bearing recessed potions 9a which are opened downward, extend upward and are arched upward.

Next, as illustrated in FIG. 8 to FIG. 11, the mounting member 11 has a rotary shaft portion 13 which is rotatable by being pivotally supported in the aforementioned one pair of bearing recessed portions 9a at both ends and an abutment body 12 which is detachably restrained in the mounting member housing 7 by rotation with the rotary shaft potion 13 being disposed at a position which is eccentric to one side.

In a case of the present embodiment, the mounting member 11 has an upper locking piece 14 which projects from the rotary shaft portion 13 side in a transverse direction and can be engaged with the aforementioned locking receiving portion 8a by rotation of the rotary shaft portion 13 and a lower locking piece 16 which projects to the opposite side in a state of being in unevenly parallel with the upper locking piece 14 at a position where it faces the upper locking piece 14 via the abutment body 12 which is provided integrally with the rotary shaft portion 13 and abuts against the bottom face of the aforementioned second support wall portion 5 when the aforementioned upper locking piece 14 is engaged with the engaging receiving portion 8a.

In the present embodiment, the abutment body 12 is configured by block-shaped ones which are separately disposed on the left and right sides of the rotary shaft portion 13 in pair.

That is, in a case of an illustrated example, the abutment body 12 has an upper face portion 12a which is set to a length along which it extends from the rotary shaft portion 13 in parallel with an extending direction of the upper locking piece 14 and abuts against an end face of the second support wall portion 5 when the aforementioned upper locking piece 14 is locked to the locking receiving portion 8a, an abutment face portion 12b which bends at right angles from a leading end of the upper face portion 12a and is in contact with the end face of the second support wall portion 5, a guide face portion 12c which extends from the aforementioned rotary shaft portion 13 in an tangential direction on the side facing the abutment face portion 12b and is inclined, and a bottom face portion 12d which extends from a leading end of the guide face portion 12c to the abutment face portion 12b in parallel therewith, facing the aforementioned upper face portion 12a and is provided with the lower locking piece 16 on an extension of the abutment face portion 12b.

Then, an elastic arm 17 which extends from the aforementioned rotary shaft 13 side to the lower locking piece 16 side in an arc-shaped form is provided between the aforementioned one pair of the abutment bodies 12 and a claw-shaped locking stepped portion 18 is installed on a leading end of the elastic arm 17 in a protruded state.

The locking stepped portion 18 is configured by a guide face 18a which is gradually inclined outward and an abutment face portion 18b which is notched from a leading end of the guide face portion 18a toward the inside so as to be L-shaped in section.

In the present embodiment, the elastic arm 17 having the locking claw portion 18 is disposed at the center of the rotary shaft portion 13 in correspondence with the latching portion 5a of the aforementioned second support wall portion 5 and the lower locking pieces 16 of the abutment bodies 12 which are disposed on both of the left and right sides thereof are disposed to freely abut against the bottom face of the second support wall portion 5 on which the aforementioned latching portion 5a is not formed.

Here, the bottom face of the second support wall portion 5 against which the lower locking piece 16 abuts may be dented upward beyond the latching portion 5a.

In addition, since the aforementioned latching portion 5a abuts against the guide face 18a of the locking stepped portion 18 of the elastic arm 17, it is preferable to notch the bottom face of the leading end so as to have an inclined plane which is almost the same as that of the guide face 18a so that the guide face 18a can be slid easily.

Next, a procedure of fixing the mounting bed plate 31 of the caster 30 to the caster mounting portion 2 will be described.

Since a distance between the first support wall portion 4 and the second support wall portion 5 of the caster mounting portion 2 is set such that the both ends 31a and 31b in the front-back direction of the mounting bed plate 31 closely abut against the upper end faces of the first support wall portion 4 and the second support wall portion 5, they are set shorter than the length in the front-back direction of the mounting bed plate 31 respectively by the amounts of their thicknesses.

Then, as illustrated in FIG. 1, the mounting bed plate 31 of the caster 30 is inserted into the part above the caster mounting portion 2 with the other-end 31b side facing obliquely upward.

Figure 3:
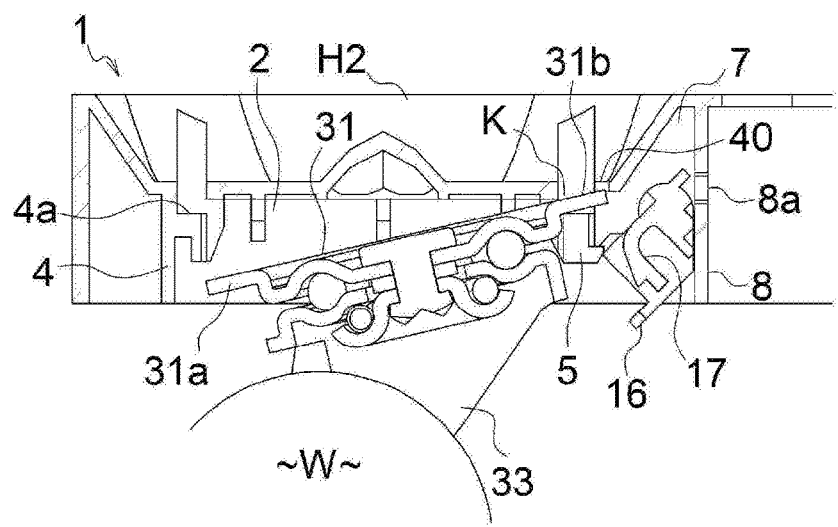
FIG. 3 is an essential part sectional diagram of a state of obliquely inserting a caster mounting bed plate into a caster mounting portion.
Figure 4:
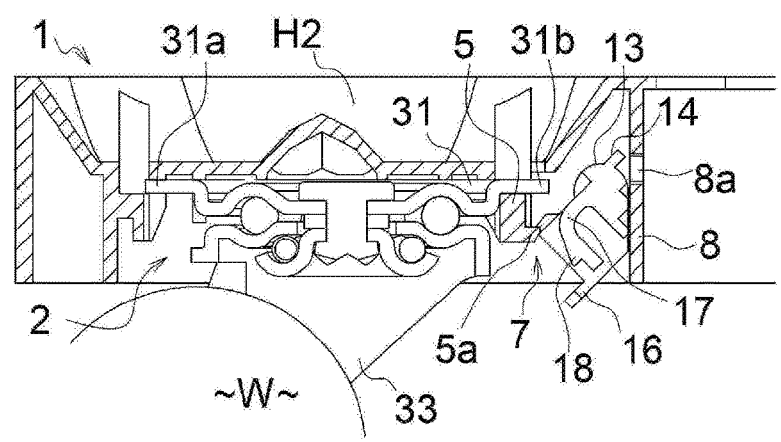
FIG. 4 is an essential part sectional diagram of a state where the mounting bed plate is made horizontal on the caster mounting portion.

Thereby, since the aforementioned other end 31b is inserted into the gap K which is opened above the second support wall portion 5 as illustrated in FIG. 3, the aforementioned one end 31a which faces obliquely downward is passed into the first support wall portion 4 and is pushed up onto the caster mounting portion 2 and thereby the mounting bed plate 31 can be brought into an almost horizontal posture as illustrated in FIG. 4.

Then, the mounting bed plate 31 is slid to a position where the aforementioned one end 31a thereof abuts against the first support wall portion 4 with the one end 31a of the mounting bed plate 31 being put on the stepped portion 4a of the first support wall portion 4.

Figure 5:
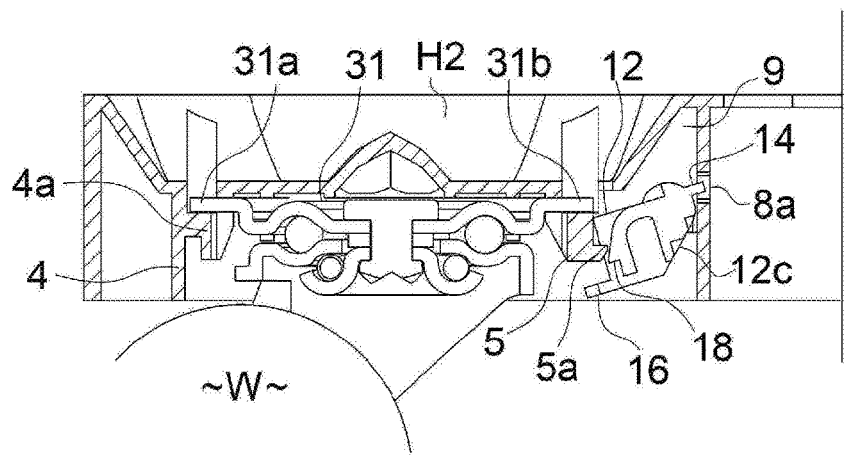
FIG. 5 is an essential part sectional diagram of a state of positioning performed by abutting one end of the mounting bed plate against a first support wall portion.

Thereby, since the mounting bed plate is supported horizontally with one end 31a and the other end 31b of the mounting bed plate 31 being installed on the stepped portion 4a of the first support wall part 4 and on an upper face of the second support wall part 5 and is positioned in abutment against the ends of these support wall portions 4 and 5, it does not project outward (see FIG. 5).

It is to be noted that movement of the upper face and the left and right ends of the aforementioned mounting bed plate 31 is restrained by the aforementioned ribs L1 and L2 formed on the caster mounting portion 2.

The mounting member 11 is inserted into the mounting member housing portion 7 from below simultaneously with insertion of the mounting bed plate 31 into the caster mounting portion 2 or after the above-mentioned positioning was performed.

In insertion of the mounting member 11, it is inclined such that the upper locking piece 14 obliquely faces upward, the lower locking piece 16 obliquely faces downward and the guide face portion 12c of the abutment body 12 comes into parallel with the opposed wall 8 and is inserted into the mounting member housing portion 7 in a posture that the breadth-width of the mounting member 11 is reduced (see FIG. 1, FIG. 3 and FIG. 4).

Then, the ends of the rotary shaft portion 13 of the mounting member 11 are inserted upward from opened lower parts of the bearing recessed portions 9a recessed in the left and right sidewalls 9 of the mounting member housing portion 7 and the rotary shaft portion 13 comes into sliding contact with the upper-end arched portions of the bearing recessed portions 9a and bears it to be rotatable.

The mounting member 11 rotates in a clockwise direction in the drawing about the rotary shaft portion 13, and displaces the upper locking piece 14 downward from the top and displaces the lower locking piece 16 and the locking stepped portion 18 of the aforementioned elastic arm 17 upward from the bottom (see FIG. 5).

Since in the present embodiment, a base end of the upper locking piece 14 and a base end of the lower locking piece 16 are almost 180 degrees apart centering on an axis of the rotary shaft portion 13 and the upper locking piece 14 and the lower locking piece 16 extend in parallel with each other, when the upper locking piece 14 is displaced in a direction that it is latched onto the locking receiving portion 8a by clockwise rotation of the mounting member 11, the lower locking piece 16 approaches the bottom face of the second bearing wall portion 5 from below and, simultaneously therewith, the guide face 18a of the locking stepped portion 18 abuts against the lower end of the latching portion 5a of the second support wall portion 5 and warps inward the locking stepped portion 18 while increasing repulsion of the elastic arm 17 so as to make it pass the latching portion 5a.

Figure 6:
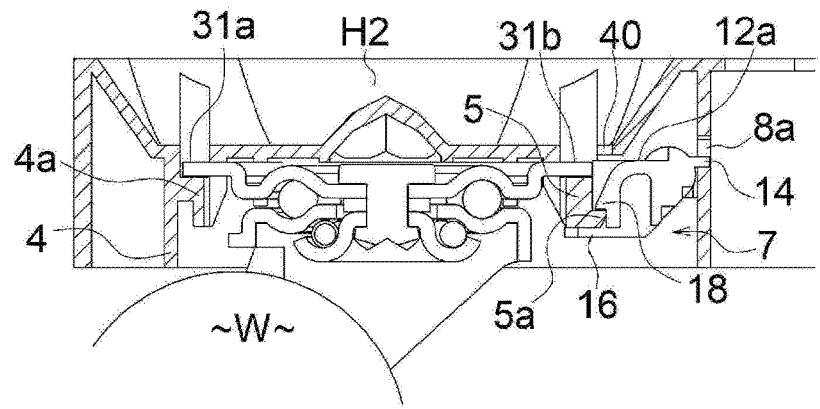
FIG. 6 is an essential part sectional diagram of a state where a mounting member is rotated and fixed in a mounting member housing portion and the other end of the mounting bed plate is restrained.

Further, when the mounting member 11 rotates and the upper locking piece 14 abuts against the upper face of the locking receiving portion 8a, the lower locking piece 16 abuts against the bottom face of the second support portion 5 and, simultaneously therewith, the locking stepped portion 18 climbs over the latching portion 5a, the elastic arm 17 repels in a return direction, the abutment face portion 18b is latched onto the upper face and an elevation surface of a protruded end of the latching portion 5a and the mounting member 11 is fixed in the mounting member housing portion 7 (see FIG. 6).

Thereby, since the other end 31b of the mounting bed plate 31 which is aligned with and installed on the upper face of the second support wall portion 5 abuts against the abutment face portion 12b of the abutment body 12 of the mounting member 11 which is fixed in the mounting member housing portion 7 and the front-back direction movement of the mounting bed plate 31 is restrained, the caster 30 can be fixed to the caster mounting portion 2 of the weighing table 1 via the mounting bed plate 31.

Next, a window hole 40 which passes through the upper wall face of the caster mounting portion 2 is pierced in order to remove the mounting bed plate 31 of the caster 30 from the caster mounting portion 2 of the weighing table 1 by detaching the mounting member 11 which is restrained in the mounting member housing portion 7.

In the present embodiment, since the upper part of the mounting member housing portion 7 configures the bottom face of the recessed portion H2 which houses the caster 30 of the upper-stage carriage when stacking the carriages one on top of the other, the window hole 40 is formed in the bottom face.

The position of the window hole 40 is set to a position located directly above the aforementioned latching portion 5a.

Figure 7:
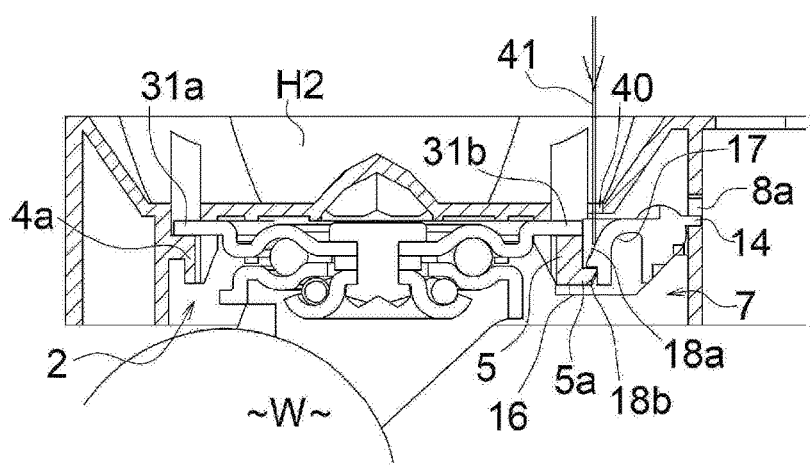
FIG. 7 is an essential part sectional diagram illustrating a state of detaching the fixed mounting member.
Figure 8:
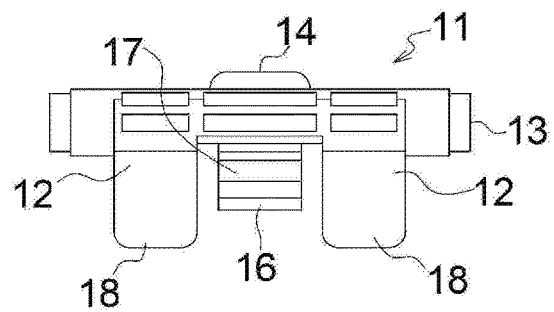
FIG. 8 is a front view of the mounting member.
Figure 9:
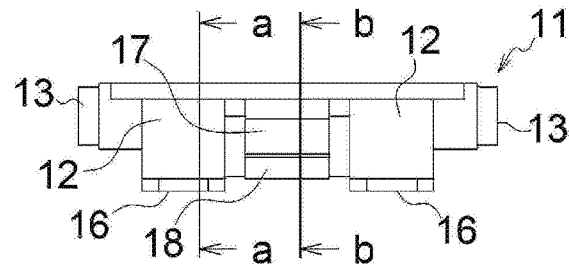
FIG. 9 is a rear view of the same.

Therefore, when a rod-like jig 41 is inserted through the window hole 40 directly downward as illustrated in FIG. 7, a leading end of the jig 41 abuts against the guide face 18a of the locking stepped portion 18 which is locked to the latching portion 5a.

Thus, since the locking stepped portion 18 can be warped inward via the aforementioned guide face 18a and the abutment face portion 18b can be detached from the latching portion 5a by pushing the jig 41 downward, engagement of the mounting member 11 is released.

The rotary shaft portion 13 is rotated in a counterclockwise direction, the upper locking piece 14 is removed from the engagement receiving portion 8a and the lower locking piece 16 is separated from the bottom face of the second support wall portion 30 by further pushing the jig 41 downward, and thereby the mounting member 11 can be drawn out of the mounting member housing portion 7.

In association therewith, front-back direction restraint of the mounting bed plate 31 is released and thereby the mounting bed plate 31 can be detached from the caster mounting portion 2 in the reverse order to the aforementioned mounting.

Although, in the present embodiment, the recessed portion H2 is formed above the aforementioned latching portion 5a and therefor the window hole 40 is pierced in the bottom face of the recessed portion H2, it is not limited to the above-described configuration as long as it is a through-hole into which the rod-like jig 41 can be inserted.

Front-back arrangement of the caster mounting portion 2 and the mounting member housing portion 7 may be the same as that in the aforementioned embodiment and they may be arranged in reverse order.

Figure 12:
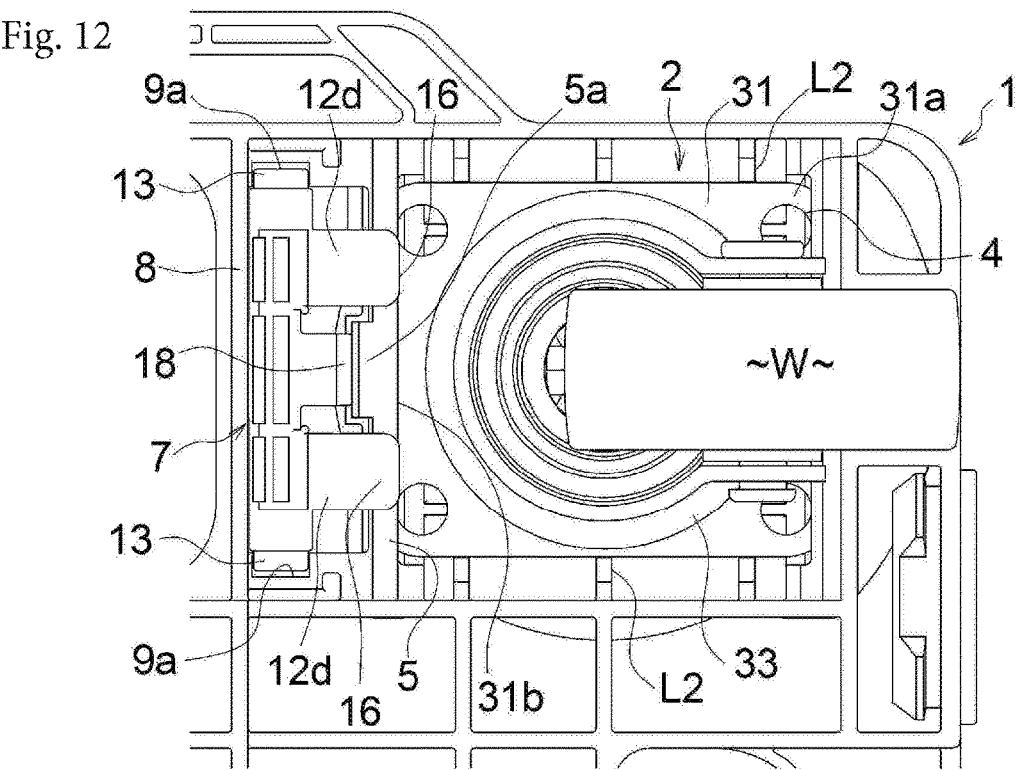
FIG. 12 is an essential part bottom view of a weighing table in a caster fixed state.
Figure 13:
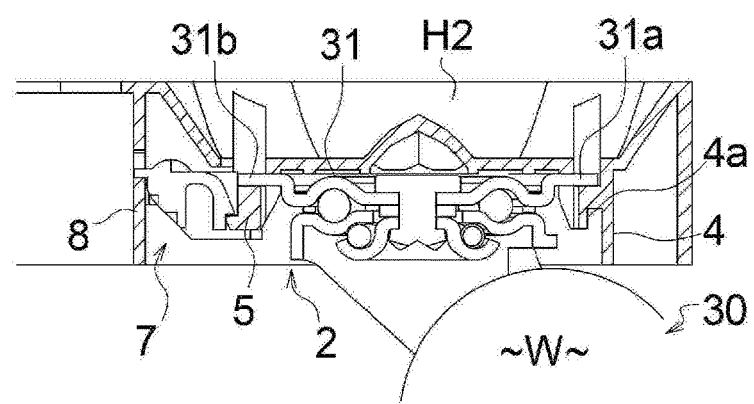
FIG. 13 is an essential part sectional diagram viewed from the side-face side of the same.

FIG. 12 and FIG. 13 are a case where the caster mounting portion 2 is installed behind the weighing table 1 and illustrate an example in which the caster mounting portion 2 is disposed near a trailing-end edge of the weighing table 1 and the mounting member housing portion 7 is disposed close to the center of the weighing table 1.

Also in this case, they may be configured by reversing front/back conforming to the aforementioned embodiment.

In addition, although in the above-described embodiment, a case where the mounting bed plate 31 can be moved in the caster mounting portion only in the front-back direction is exemplified, it may have a configuration that it can be moved only in the left-right direction.

Also, in that case, they may be configured by replacing the front-back one with the left-right one.

With regard to others, in short, it goes without saying that various designs and alterations may be made within a range not deviating from the gist of the present invention.

DESCRIPTION OF REFERENCE NUMERALS OR SYMBOLS

1 weighing table
2 caster mounting portion
4 first support wall portion 4
4*a* stepped portion
5 second support wall portion 5
5*a* latching portion 5*a*
7 mounting member housing portion 7
8 opposed wall 8
8*a* locking receiving portion
9 left and right sidewalls 9
9*a* bearing recessed portion 9*a*
10 carriage
11 mounting member 11
12 abutment body 12
12*a* upper face portion 12*a*
12*b* abutment face portion 12*b*
12*c* guide face portion 12*c*
12*d* bottom face portion 12*d*
13 rotary shaft portion 13
14 upper locking piece 14
16 lower locking piece 16
17 elastic arm 17
18 locking stepped portion 18
18*a* guide face 18*a*
18*b* abutment face portion 18*b*
30 caster
31 mounting bed plate
32 bearing portion
33 support yoke
40 window hole
41 jig

The invention claimed is:
1. A mounting structure for a caster, wherein
a mounting bed plate of the caster is inserted into a caster mounting portion which is provided on a bottom face of a weighing table of a carrier from below and said mounting bed plate is detachably fixed to said caster mounting portion which regulates movement in an upward direction and a left-right or front-back direction at a predetermined position by using one mounting member,
the caster mounting portion has a first support wall portion with a stepped portion against which one end of the mounting bed plate abuts and which supports the bottom face on the one-end side,
a second support wall portion which supports the bottom face on the other-end side of said mounting bed plate,
a mounting member housing portion which houses the mounting member adjacently to the second support wall portion, and
a latching portion which is formed on said second support wall portion and projects into the mounting member housing portion,
said mounting member housing portion is provided with a locking receiving portion on an opposed wall portion which faces the second support wall portion separately from each other and has bearing recessed portions in one pair of left and right sidewalls, and
the mounting member is configured by a rotary shaft portion which is rotatable by being pivotally supported in said one pair of bearing recessed portions,
an abutment body in which the rotary shaft portion is provided at an eccentric position and which is restrained in the mounting member housing portion by rotation of the rotary shaft portion,
an upper locking piece which projects to one side from the rotary shaft portion side and can be latched onto said locking receiving portion by rotation of the rotary shaft portion,
a lower locking piece which projects in a direction opposite to that of the upper locking piece in said abutment body and displaces to a position where it abuts against a bottom face of said second support wall portion when said upper locking piece displaces to a position where it engages with the locking receiving portion by rotation of the rotary shaft portion, and
a locking stepped portion which is formed on a leading end of an elastic arm which extends from said rotary shaft portion to the lower locking piece side and is locked to a latching portion of the second support wall portion when said lower locking piece abuts against the bottom face of the second support wall portion.

2. The mounting structure for caster according to claim 1, wherein
the caster mounting portion has a first support wall with a stepped portion against which one end of the mounting bed plate abuts when horizontally moving the mounting bed plate of the caster in a direction that movement is not regulated and which supports the bottom face on the one-end side thereof,
a second support wall portion which supports the bottom face on the other-end side without restraining movement of the other end in horizontal movement of said mounting bed plate,
said mounting member housing portion is provided with a locking receiving portion on an opposed wall portion which faces the second support wall portion separately from each other and has bearing recessed portions which are opened downward and are arched upward in one pair of left and right sidewalls, and
a locking stepped portion which is formed on a leading end of an elastic arm which extends from said rotary shaft portion to the lower locking piece side, abuts against the latching portion of the second support wall portion from below before said lower locking piece abuts against the second support wall portion, climbs over the latching portion by warping said elastic arm and is locked to said latching portion with the aid of elastic return force at a position where said lower locking piece abuts against the bottom face of the second support wall portion.

3. The mounting structure for caster according to claim 1, wherein a window hole into which a jig is inserted to displace a locking pawl portion which engages with said latching portion in an engagement releasing direction is pierced in an upper part of the mounting member housing portion.

4. The mounting structure for caster according to claim 1, wherein the latching portion is disposed at the center of the bottom face of the second support wall portion, and the mounting member is configured by separately forming one pair of abutment bodies on both of the left and right sides of the rotary shaft portion and installing the lower locking piece on each abutment body in a protruded state, and disposing the elastic arm between the one pair of the abutment bodies of the rotary shaft portion.

5. The mounting structure for caster according to claim 1, wherein the mounting member is configured by the rotary shaft portion having both ends which respectively fit into and are bore in one pair of the left and right bearing recessed portions respectively, the upper locking piece which projects outward at the center of the rotary shaft portion, one pair of block-shaped abutment bodies which project in a direction opposite to that of the upper locking piece and are disposed on both of the left and right sides of said rotary shaft portion separately from each other, the lower locking piece which projects in a direction opposite to that of the upper locking piece under each of one pair of the abutment bodies, the elastic arm which projects downward via a curved portion between the left and right abutment bodies on the rotary shaft portion, and the locking stepped portion which is formed at a position under the elastic arm and above said lower locking piece.

6. The mounting structure for caster according to claim 1, wherein the abutment body has an upper face portion which is set to a length along which it extends from the rotary shaft portion in parallel with an extending direction of the upper locking portion and abuts against an end face of the second support wall portion when said upper locking piece is locked to the locking receiving portion, an abutment face portion which is bent from the leading end of the upper face portion at right angles and is in contact with an end face of the second support wall potion, a guide face portion which extends from said rotary shaft portion in a tangential direction on the side facing the abutment face portion and is inclined, and a bottom face portion which extends from a leading end of the guide face portion to the abutment face portion, facing and in parallel with said upper face portion and is provided with the lower locking piece on an extension of the abutment face portion.

7. The mounting structure for caster according to claim 1, wherein the weighing table is rectangular.

8. The mounting structure for caster according to claim 1, wherein the caster is a swivel caster which has the mounting bed plate thereon.

* * * * *